(12) United States Patent
Legrand

(10) Patent No.: US 7,543,387 B2
(45) Date of Patent: Jun. 9, 2009

(54) CUTTING UNIT AND CUTTING FILAMENT FOR A PLANT CUTTING DEVICE

(75) Inventor: Emmanuel Legrand, Villeneuve (FR)

(73) Assignee: Speed France (FR)

( * ) Notice: Subject to any disclaimer, the term of this patent is extended or adjusted under 35 U.S.C. 154(b) by 0 days.

(21) Appl. No.: 11/006,080

(22) Filed: Dec. 7, 2004

(65) Prior Publication Data

US 2005/0081389 A1    Apr. 21, 2005

Related U.S. Application Data

(63) Continuation of application No. PCT/FR02/01959, filed on Jun. 7, 2002.

(51) Int. Cl.
*A01D 55/18* (2006.01)
(52) U.S. Cl. .......................................... 30/276; 56/12.7
(58) Field of Classification Search ................... 30/276; 56/12.7
See application file for complete search history.

(56) References Cited

U.S. PATENT DOCUMENTS

| | | | |
|---|---|---|---|
| 2,434,533 A | 1/1948 | Wurzburger | |
| 3,066,366 A | 12/1962 | Wyckoff et al. | |
| 3,708,967 A | 1/1973 | Geist et al. | |
| 3,720,055 A | 3/1973 | de Mestral et al. | |
| 3,826,068 A | 7/1974 | Ballas et al. | |
| 4,035,912 A | 7/1977 | Ballas et al. | |
| 4,043,037 A | 8/1977 | Okamoto et al. | |
| 4,054,992 A | 10/1977 | Ballas et al. | |
| 4,054,993 A | 10/1977 | Kamp et al. | |
| 4,062,114 A | 12/1977 | Luick | |
| 4,067,108 A | 1/1978 | Ballas | |
| 4,104,797 A | 8/1978 | Ballas | |
| 4,118,865 A | 10/1978 | Jacyno et al. | |
| 4,126,990 A | 11/1978 | Ballas | |
| 4,172,322 A | 10/1979 | Ballas | |
| 4,177,561 A | 12/1979 | Ballas | |

(Continued)

FOREIGN PATENT DOCUMENTS

AU    502953    8/1979

(Continued)

OTHER PUBLICATIONS

International Search Report for FA 661015 and FR 0500702 filed Sep. 6, 2005.

(Continued)

*Primary Examiner*—Kenneth E. Peterson
(74) *Attorney, Agent, or Firm*—Alston & Bird LLP

(57) ABSTRACT

A cutting unit for a plant or vegetation cutting device and which comprises a rotary cutting head and at least one cutting filament extending radially from the head. The filament has a cutting edge which is defined by two intersecting faces, and the filament is retained by the cutting head in an angular position wherein the cutting edge constitutes the leading edge that engages the plants during operation of the cutting unit. The filament may have a primary or preferred bending plane, and the filament is held in a configuration wherein the filament is bent essentially in the primary bending plane. Also, the localized working zone may be formed of a material which is different from the material of the remainder of the filament.

11 Claims, 6 Drawing Sheets

U.S. PATENT DOCUMENTS

| | | | |
|---|---|---|---|
| 4,185,381 A | | 1/1980 | Palmieri et al. |
| 4,186,239 A | * | 1/1980 | Mize et al. .................. 428/399 |
| 4,199,926 A | | 4/1980 | Petty |
| 4,209,902 A | | 7/1980 | Moore et al. |
| 4,238,866 A | | 12/1980 | Taylor |
| 4,271,595 A | | 6/1981 | Rahe |
| 4,282,653 A | | 8/1981 | Comer et al. |
| 4,301,642 A | | 11/1981 | Thurber |
| 4,335,510 A | | 6/1982 | Close et al. |
| 4,362,007 A | | 12/1982 | Kennedy et al. |
| 4,367,587 A | | 1/1983 | Kilmer |
| 4,411,069 A | | 10/1983 | Close et al. |
| 4,685,279 A | | 8/1987 | Gullett |
| 4,726,176 A | | 2/1988 | McGrew |
| 4,756,146 A | | 7/1988 | Rouse |
| 4,835,867 A | | 6/1989 | Collins et al. |
| 4,852,258 A | | 8/1989 | Foster |
| D303,603 S | | 9/1989 | Zimmerman |
| 4,869,055 A | | 9/1989 | Mickelson |
| 4,905,465 A | | 3/1990 | Jones et al. |
| 5,048,278 A | | 9/1991 | Jones et al. |
| 5,220,774 A | | 6/1993 | Harbeke et al. |
| 5,276,968 A | | 1/1994 | Collins et al. |
| 5,398,416 A | | 3/1995 | Mackey |
| D358,535 S | | 5/1995 | Skinner |
| 5,430,943 A | | 7/1995 | Lee |
| 5,433,006 A | | 7/1995 | Taguchi |
| D364,079 S | | 11/1995 | Skinner |
| 5,463,815 A | | 11/1995 | Fogle |
| 5,524,350 A | | 6/1996 | Boland |
| D376,078 S | | 12/1996 | Skinner |
| D376,739 S | | 12/1996 | Skinner |
| D379,052 S | | 5/1997 | Skinner |
| 5,687,482 A | * | 11/1997 | Behrendt ..................... 30/276 |
| 5,709,942 A | | 1/1998 | Leydon et al. |
| 5,713,191 A | * | 2/1998 | Welton ........................ 56/12.1 |
| 5,758,424 A | | 6/1998 | Iacona et al. |
| 5,761,816 A | | 6/1998 | Morabit et al. |
| 5,765,287 A | | 6/1998 | Griffini et al. |
| 5,836,227 A | | 11/1998 | Dees, Jr. et al. |
| 5,852,876 A | | 12/1998 | Wang |
| 5,855,068 A | | 1/1999 | Zilly et al. |
| 5,887,348 A | | 3/1999 | Iacona et al. |
| 5,890,352 A | | 4/1999 | Molina |
| 5,896,666 A | * | 4/1999 | Iacona et al. .................. 30/276 |
| 5,901,448 A | | 5/1999 | Lingerfelt |
| 5,979,064 A | | 11/1999 | Kitz et al. |
| 5,996,233 A | * | 12/1999 | Morabit et al. ................ 30/276 |
| 6,018,840 A | | 2/2000 | Guay et al. |
| 6,032,442 A | | 3/2000 | Paolo |
| 6,035,618 A | | 3/2000 | Fogle |
| 6,045,911 A | | 4/2000 | Legrand et al. |
| 6,058,574 A | | 5/2000 | Facey et al. |
| 6,061,914 A | | 5/2000 | Legrand |
| 6,094,823 A | | 8/2000 | Brown et al. |
| 6,119,350 A | | 9/2000 | Sutliff et al. |
| 6,124,034 A | * | 9/2000 | Proulx et al. ................ 428/400 |
| RE36,940 E | * | 11/2000 | Fogle ........................... 30/276 |
| 6,148,523 A | | 11/2000 | Everts et al. |
| 6,161,292 A | | 12/2000 | Morabit et al. |
| 6,171,697 B1 | | 1/2001 | Legrand |
| 6,240,643 B1 | | 6/2001 | Civalleri |
| 6,279,235 B1 | | 8/2001 | White, III et al. |
| 6,314,848 B2 | | 11/2001 | Morabit et al. |
| 6,347,455 B2 | * | 2/2002 | Brant et al. ................... 30/276 |
| 6,401,344 B1 | | 6/2002 | Moore et al. |
| 6,519,857 B1 | | 2/2003 | Prouix et al. |
| 6,560,878 B2 | | 5/2003 | Skinner et al. |
| 6,581,292 B2 | | 6/2003 | Allis |
| 6,601,373 B1 | | 8/2003 | Legrand |
| 6,630,226 B1 | | 10/2003 | Legrand |
| 6,874,235 B1 | | 4/2005 | Legrand |
| 6,910,277 B2 | | 6/2005 | Proulx et al. |
| 6,912,789 B2 | | 7/2005 | Price, III |
| 6,928,741 B2 | | 8/2005 | Proulx et al. |
| 6,944,956 B1 | | 9/2005 | Fogle |
| 7,000,324 B2 | | 2/2006 | Fogle |
| 7,111,403 B2 | | 9/2006 | Moore |
| 7,257,898 B2 | | 8/2007 | Iacona |
| 2001/0027610 A1 | | 10/2001 | Wheeler et al. |
| 2002/0023356 A1 | | 2/2002 | Skinner et al. |
| 2003/0033718 A1 | | 2/2003 | Alliss |
| 2003/0200662 A1 | | 10/2003 | Moore |
| 2004/0128840 A1 | | 7/2004 | Prouix et al. |
| 2005/0028390 A1 | | 2/2005 | Legrand |
| 2005/0081389 A1 | | 4/2005 | Legrand |
| 2005/0172501 A1 | | 8/2005 | Fogle |
| 2005/0188547 A1 | | 9/2005 | Legrand |
| 2005/0229402 A1 | | 10/2005 | Iacona |
| 2007/0123092 A1 | | 5/2007 | Legrand |

FOREIGN PATENT DOCUMENTS

| | | |
|---|---|---|
| DE | 1 704 986 | 3/1967 |
| DE | 4321650 | 10/1994 |
| DE | 19632721 | 2/1998 |
| DE | 19817883 | 11/1999 |
| EP | 0 824 854 | 2/1998 |
| EP | 0867108 | 9/1998 |
| EP | 1 057 396 A1 | 12/2000 |
| EP | 10888476 | 4/2001 |
| EP | 1 129 609 A1 | 9/2001 |
| JP | 63059812 A | 3/1988 |
| JP | 7184446 | 7/1995 |
| NL | 8302111 | 6/1986 |
| WO | WO 97/19584 | 6/1997 |
| WO | WO 97/43469 | 11/1997 |
| WO | WO 99/40773 A1 | 8/1999 |

OTHER PUBLICATIONS

International Search Report for PCT/FR2004/000031 filed Aug. 30, 2004.

International Search Report for FR2004/000105 filed Sep. 29, 2004.

International Search Report for PCT/IB2004/000855 filed Jul. 15, 2004.

International Search Report for PCT/IB2004/000770 filed Jun. 18, 2004.

International Search Report for PCT/IB2004/000436 filed Jul. 1, 2004.

International Search Report for PCT/IB2004/000819 filed Jul. 8, 2004.

International Search Report for PCT/FR 01/02730 filed Apr. 25, 2002.

* cited by examiner

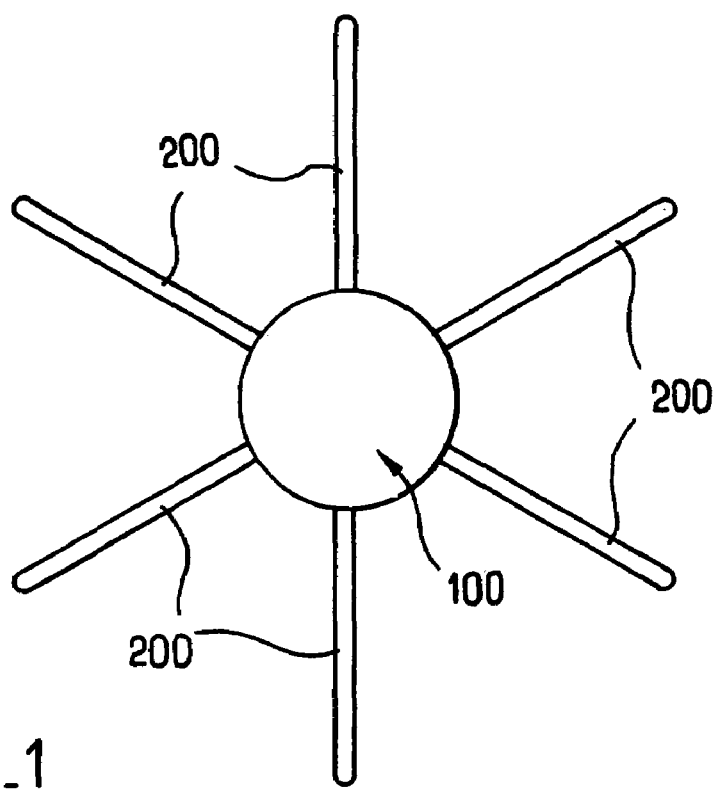
FIG_1
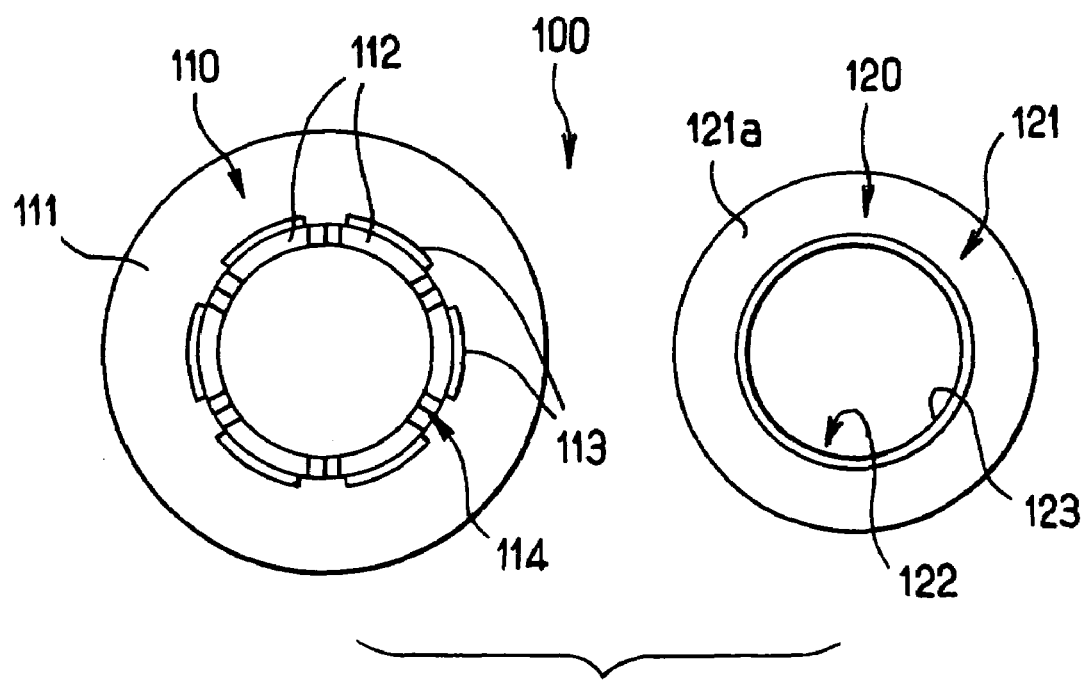
FIG_2

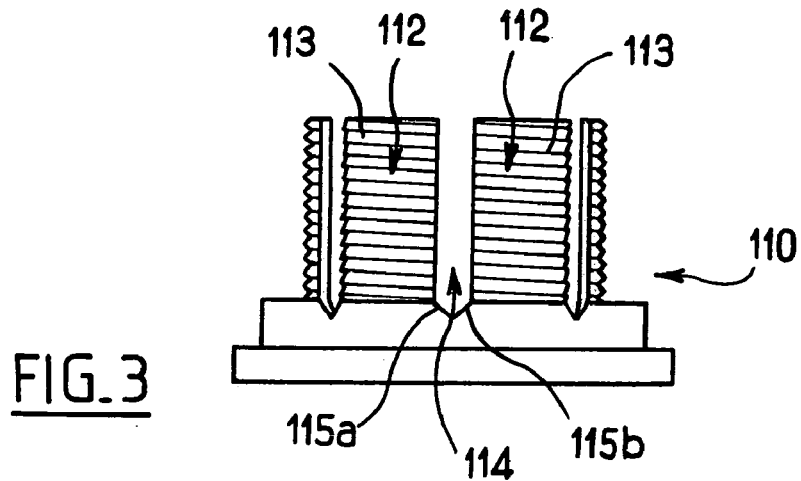
FIG. 3
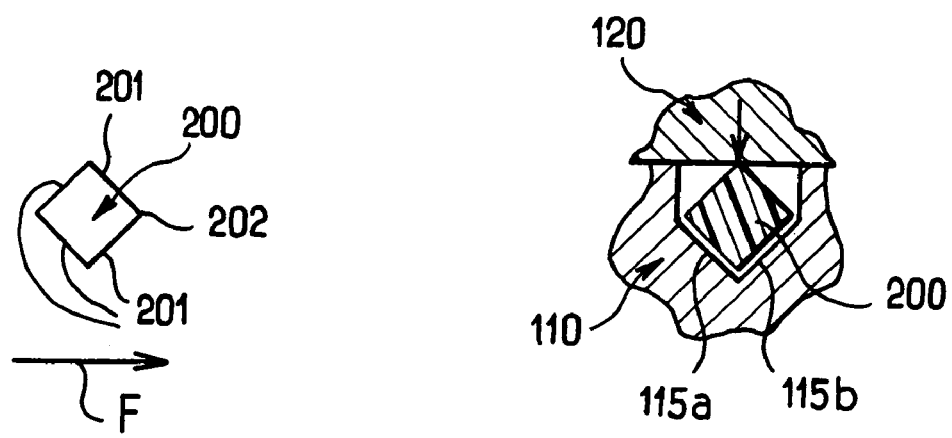
FIG. 4
FIG. 5
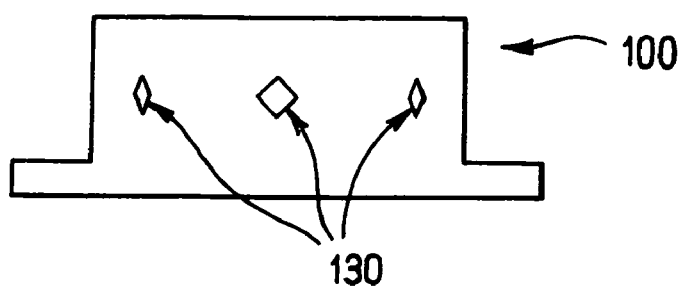
FIG. 6

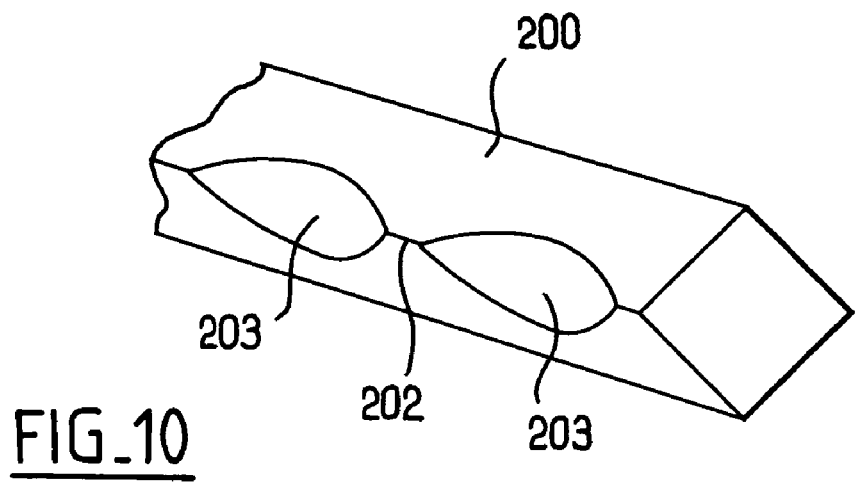
FIG_10
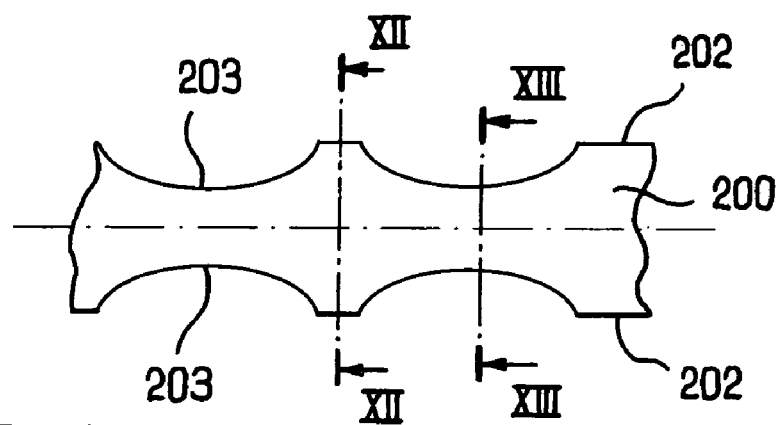
FIG_11
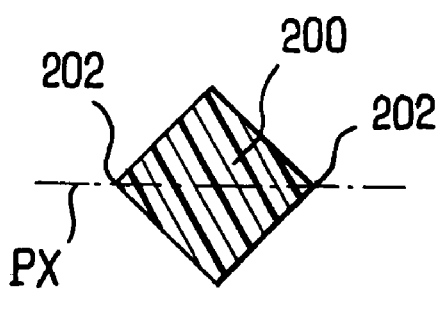
FIG_12
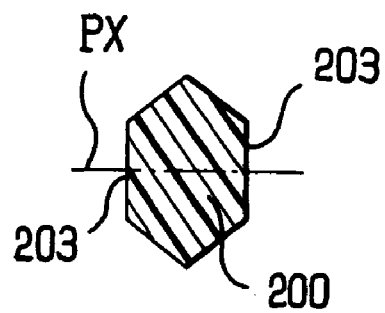
FIG_13

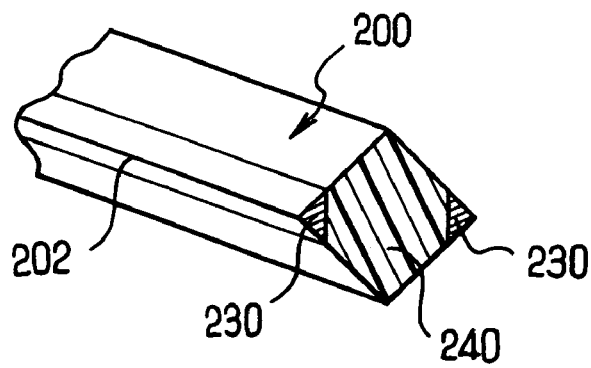
FIG_14
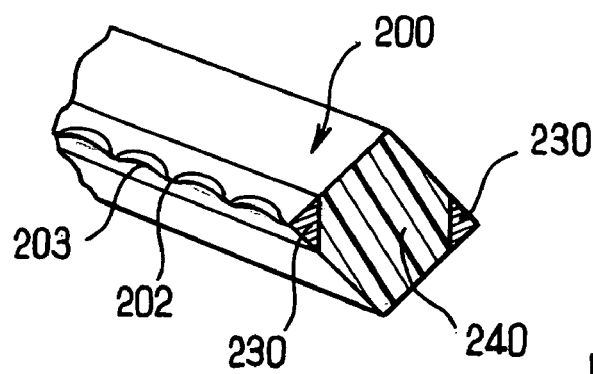
FIG_15
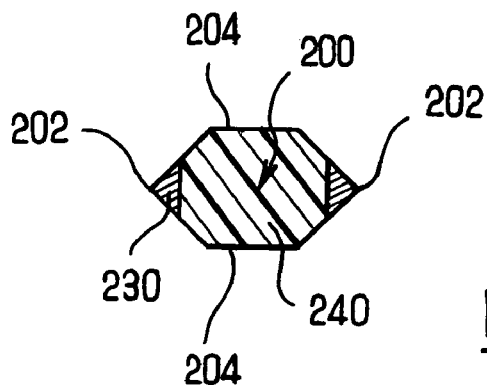
FIG_16
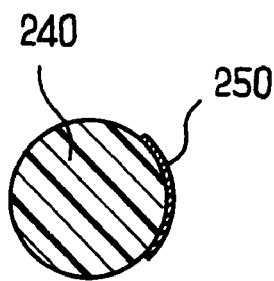
FIG_17
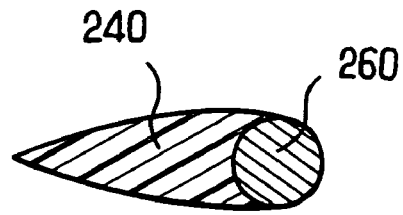
FIG_18

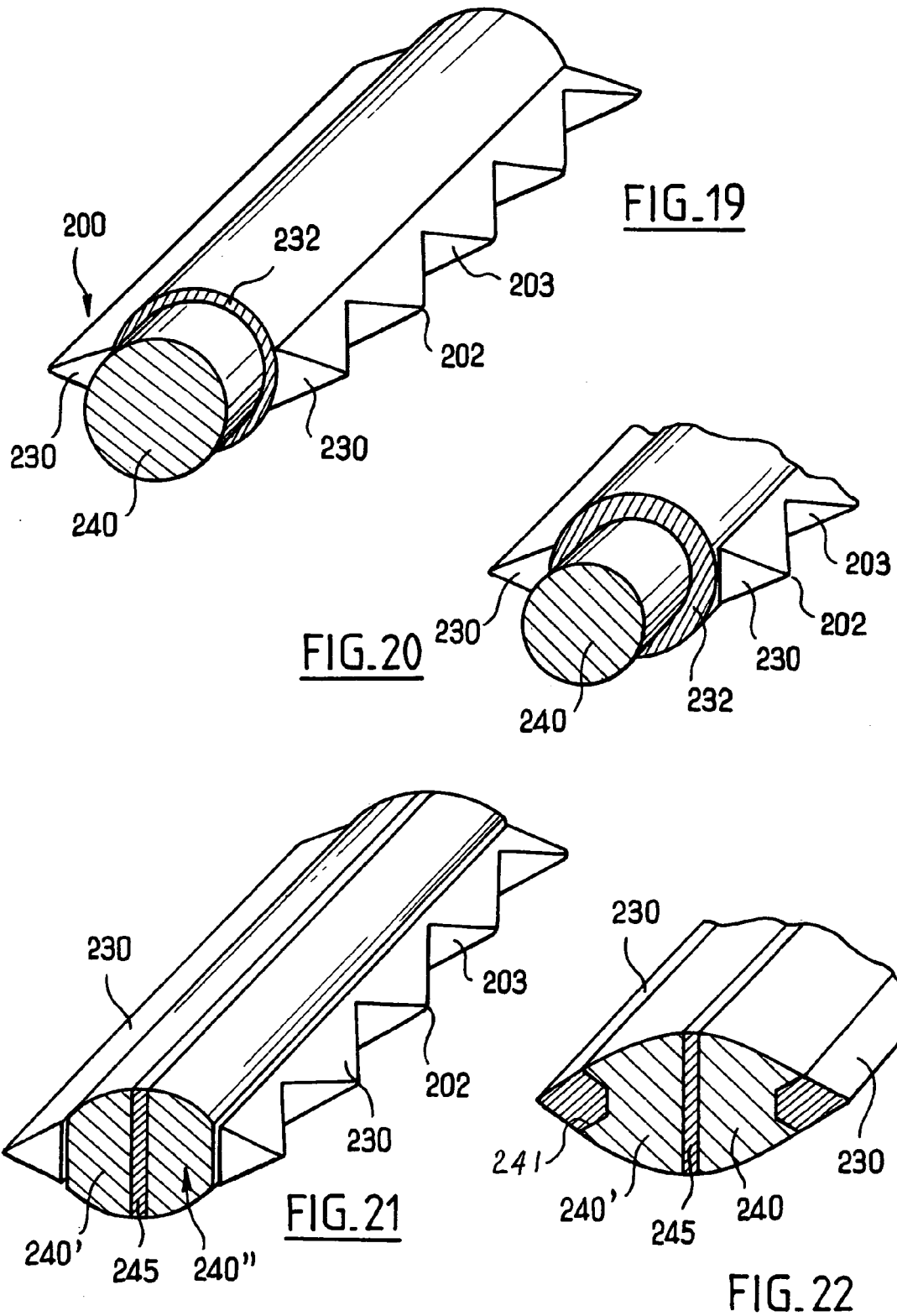

CUTTING UNIT AND CUTTING FILAMENT FOR A PLANT CUTTING DEVICE

CROSS REFERENCE TO RELATED APPLICATION

The present application is a continuation of international application PCT/FR02/01959, filed 7 Jun. 2002, and which designates the U.S. The disclosure of the referenced application is incorporated herein by reference.

BACKGROUND OF THE INVENTION

The present invention generally relates to plant cutting devices, in particular vegetation cutters or line trimmers, and more particularly, to a novel cutting head configuration and filament for such a device.

For many years, various forms of cutting strings or filaments have been developed that are designed to be mounted in a cutting head, driven by an electric motor or an engine in a manner such that the rapidly rotating head drives the filament (s), which tend(s) to take up a rectilinear configuration under the centrifugal force. Such filaments are generally made of polyamide by an extrusion process.

Whereas the older filaments were of circular cross-section and were smooth over their entire lengths, filaments have now been developed that can be of various cross-sections, intended to improve the quality of cutting (presence of edges, etc.) and/or the longevity of the filament, and/or intended to reduce the noise of the device when in operation, by acting on turbulence.

Thus, filaments exist that are provided with edges, grooves, channels, or local deformations of the filament along its length.

Unfortunately, a drawback that is common to all known filaments is that the angular positioning of the filament at its working length is generally ill-controlled, so that, when a filament is supposed to engage the plants at a cutting edge, for example, there is no guarantee that such an edge will indeed be the leading edge that hits the plants first.

An example representative of that problem lies in filaments of approximately square cross-section. In which case, the plants might be engaged, at least locally, by one of the plane faces interconnecting two consecutive edges, instead of by an edge of the filament.

And even though attempts have been made to develop filaments whose cutting effectiveness is improved compared with the cutting effectiveness obtained with a circular cross-section, and is independent of the real angular positioning of the filament, it can be observed that the gain in effectiveness remains extremely limited.

Document WO-A-99/40773 discloses a cutting unit with a cutting filament having an airfoil shaped profile which operates in a predetermined angular position. However, such a cutting filament requires a special manufacturing process, in which the filament must be twisted through about 90° at well-determined places in order to ensure that the airfoil profile does indeed work in the desired angular position.

Unfortunately, such an approach is incompatible with current mass production techniques using extrusion, and in which very long lengths of filament are manufactured that are then cut up into reels or strands of desired length, but in which any manufacturing action on the strands one after the other seriously jeopardizes the manufacturing cost.

Another airfoil profile is disclosed by Document U.S. Pat. No. 5,761,816, in which angular positioning of the filament is guaranteed by shaping the opening in the cutting head for passing the filament so that said opening has the same profile as the filament.

U.S. Pat. No. 5,048,278 also discloses a cutting filament of triangular cross-section that is held in a predetermined angular position where it is attached to the cutting head. Unfortunately, the cutting unit in that document suffers from two major drawbacks. Firstly, mounting the filament in the cutting head to maintain the angular positioning of the filament requires extremely complex mechanical means and extremely complex handling. Secondly, the angular position of the filament of triangular section as it is described in that document is not capable of guaranteeing optimum cutting.

Finally, U.S. Pat. No. 4,118,865 describes another cutting head having a triangular filament which, however, requires a special provision to be made, namely a washer crimped at the root of the filament in order to attach it to the cutting head, thereby complicating manufacture and making it more costly. In addition, the angular positioning of the cross-section of the filament relative to that fastening washer is not accurately defined, since fastening is apparently by manual crimping.

It is an object of the present invention to mitigate the above drawbacks of the state of the art, and to provide a cutting device in which, while using a cutting filament that is made uniformly over a very long length, in particular by extrusion, it is nevertheless possible to ensure that a cutting filament provided with a cutting edge works in a specific angular position, in which the cutting edge offers its optimum effectiveness.

SUMMARY OF THE INVENTION

The above and other objects and advantages of the present invention are achieved in a first embodiment by the provision of a cutting unit for a plant cutting device such as an edge trimmer, a vegetation cutter, etc., and which comprises a rotary cutting head and at least one filament mounted to the cutting head so as to extend radially therefrom. The filament has four faces and four corners extending along the length thereof, and with at least one of the corners defining a cutting edge which is defined by two intersecting faces. The filament is supported by the cutting head in an angular position wherein the cutting edge constitutes the leading edge that engages the plants during operation of the cutting unit. The two faces defining the cutting edge slope back respectively upwards and downwards relative to the cutting edge.

Certain preferred but non-limiting aspects of this cutting unit are as follows:

- the cutting edge is a sharp edge;
- the cutting edge is provided with teeth;
- the working zone of the filament is made of a material different from the material of which the main body of the filament is made;
- the retaining means of the cutting head comprise an opening at least partially shaped to match the cross-section of the filament;
- the retaining means of the cutting head comprise clamping means for clamping the filament, which means operate in the vicinity of the opening;
- the filament has a generally square cross-section, and is retained in the cutting head such that its faces are angularly positioned to be generally slanting relative to the horizontal and to the vertical in the cutting position; and
- the filament is retained in the cutting head such that said faces of the filament have a general angular position lying in the approximate range 35° relative to the horizontal and to the vertical to 55° relative to the horizontal and to the vertical.

In a second embodiment, the present invention provides a cutting unit for a plant-cutting device such as an edge trimmer, a vegetation cutter, etc. which cutting unit comprises a rotary cutting head and at least one cutting filament of generally uniform cross section extending from the cutting head, the cutting head having means for retaining the filament. The filament of the cutting unit has at least one localized working zone, and the filament has a primary or preferred bending plane. The retaining means of the cutting head comprises an arrangement for holding a fastening region of the filament in a shape in which it is bent essentially in the primary bending plane, and such that the localized working zone occupies a leading region that engages the plants.

Certain preferred but non-limiting aspects of this cutting unit are as follows:

the fastening region of the filament is a region bent through about 180° and interconnecting two working strands of the filament inside the cutting head;

the preferred bending plane of the filament is obtained by reducing the section of the filament in a predetermined direction, achieved by forming teeth at the localized working zone of the filament;

the localized working zone of the filament comprises a cutting edge;

the cutting edge is a sharp edge;

the localized working zone of the filament is made of a material different from the material of which a main body of the filament is made;

the retaining means of the cutting head comprise an opening at least partially shaped to match the cross-section of the filament;

the retaining means of the cutting head comprise clamping means for clamping the filament, which means operate in the vicinity of the opening;

the filament has a generally square cross-section, and is retained in the cutting head such that its faces are angularly positioned to be generally slanting relative to the horizontal and to the vertical in the cutting position; and the filament is retained in the cutting head such that said faces of the filament have a general angular position lying in the approximate range 35° relative to the horizontal and to the vertical to 55° relative to the horizontal and to the vertical.

Finally, in a third embodiment, the present invention provides a cutting filament for a plant cutting device such as an edge trimmer, a vegetation cutter, etc. including a rotary cutting head suitable for retaining the filament, the filament being of shaped section and generally uniform over its length. Also, the filament has a main body and at least one localized working zone, and the localized working zone is made of a material different from the material of which the main body is made.

Certain preferred but non-limiting aspects of this cutting unit are as follows:

the material of the localized working zone is constituted by a coating applied to the main body;

the material of the localized work zone is solid, and the main body and the solid material of the working zone are made by co-extrusion;

the filament has two working zones disposed on either side of the main body;

the working zone or at least one of the working zones has a cutting edge;

the working zone or at least one of the working zones has teeth;

the material of the working zone(s) is extended beyond it/them to surround the main body entirely;

the main body has a generally circular cross-section;

the or each working zone is fitted into the main body;

the main body is constituted by two portions situated on either side of a member made of a different material;

the member extends generally vertically;

the member is made of the same material as the working zone(s); and the main body has a convex profile in its top and/or bottom portion(s).

The invention also provides a cutting unit for a plant-cutting device such as an edge trimmer, a vegetation cutter, etc., which cutting unit comprises a rotary cutting head and at least one cutting filament as defined above, extending from the cutting head, which cutting head has retaining means for retaining the filament.

Finally, the present invention provides a plant cutting device such as an edge trimmer, a vegetation cutter, etc., and which includes a cutting unit as defined above, and a motor or engine for rotating the cutting unit.

BRIEF DESCRIPTION OF THE DRAWINGS

Other aspects, objects, and advantages of the present invention will appear more clearly on reading the following detailed description of preferred embodiments thereof, given by way of non-limiting example, and with reference to the accompanying drawings, in which:

FIG. 1 is a diagrammatic view from underneath of a cutting head of a vegetation cutter, which head is provided with a plurality of cutting filaments;

FIG. 2 is a plan view of the first and second main portions of a first example of a cutting head of the invention;

FIG. 3 is a side elevation view of one of the portions of the cutting head of FIG. 2;

FIG. 4 is a cross-section view through a cutting filament advantageously used with the cutting head of FIGS. 2 and 3;

FIG. 5 shows in section and in detail how the cutting filament of FIG. 3 co-operates with the cutting head of FIGS. 2 and 4;

FIG. 6 is a side elevation view of a cutting head in a second example of the invention;

FIG. 10 is a perspective view of another example of a cutting filament that can be used with the cutting head of FIGS. 7 and 8;

FIG. 11 is a plan view of the cutting filament of FIG. 10;

FIGS. 12 and 13 are cross-section views respectively on lines XII-XII and XIII-XIII of FIG. 11;

FIG. 14 is a perspective view of yet another example of a cutting filament of the invention;

FIG. 15 is a perspective view of yet another example of a cutting filament of the invention;

FIG. 16 is a cross-section view showing a variant embodiment of the cutting filaments of FIGS. 14 and 15;

FIG. 17 is a cross-section view of yet another example of a cutting filament of the invention;

FIG. 18 is a cross-section view of yet another example of a cutting filament of the invention; and FIGS. 19 to 22 show both in perspective and in section other examples of cutting filaments of the invention.

DETAILED DESCRIPTION OF THE PREFERRED EMBODIMENTS

Figure 7:
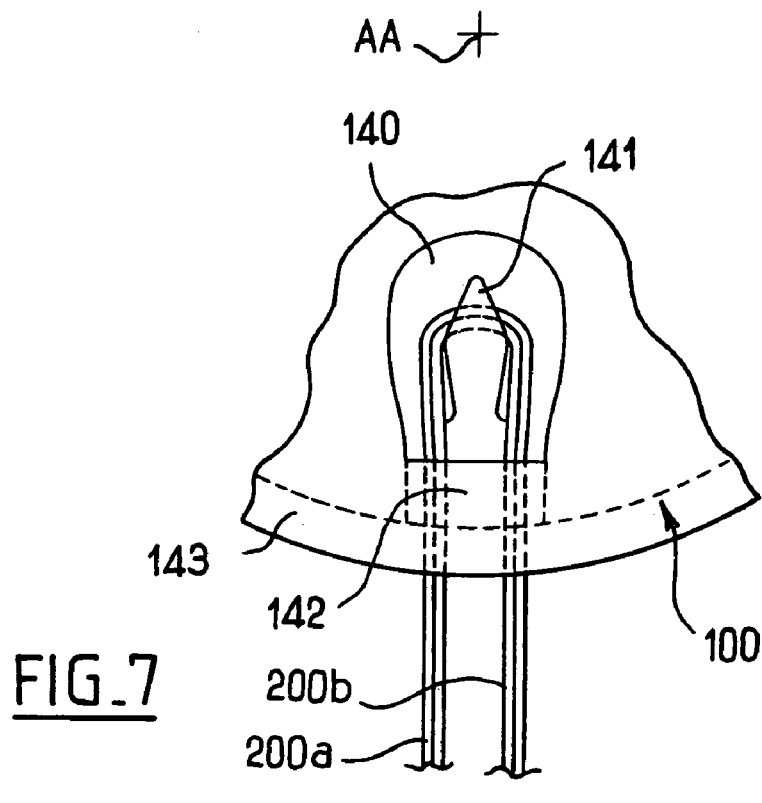
FIG. 7 is a fragmentary view from underneath of a cutting head in a third example of the invention.

Reference is made initially to FIG. 1 which diagrammatically shows a cutting unit of a vegetation cutter, which unit comprises a cutting head 100 and one or more (six, in this example) cutting filaments 200 extending at regular angular intervals (60°) around the head.

In a manner that is conventional per se, the cutting head is rotated by an engine or an electric motor (not shown), at a speed typically but in no way limiting, lying in the approximate range 1000 revolutions per minute (r.p.m.) to 4000 r.p.m.

The other equipment of the vegetation cutter, which equipment can be conventional, is not described.

FIGS. 2 and 3 show a cutting head 100 in two portions, namely a first portion 110 for receiving cutting filaments and a second portion 120 for clamping and locking.

On a generally circular base 111, the portion 110 is provided with a generally cylindrical drum which, in this example, is made up of six branches 112 separated by six slots 114 extending parallel to the axis of the drum.

The drum is externally threaded at 113 so as to receive by screw-fastening the portion 120 of the head, which portion essentially comprises a cylindrical body 121 defining a shoulder 121a which has a through central opening 122 with an internal thread 123 suitable for co-operating with the external thread 113 on the portion 110.

As can be observed in particular in FIG. 3, the end wall of each slot 114 is symmetrically V-shaped, with two faces 115a, 115b sloping at about 90° relative to each other.

FIG. 4 shows the cross-section of a cutting filament 200, which cross-section is, in this example, square so that the filament has straight faces 201 and four edges. When, relative to a horizontal cutting direction F shown in FIG. 4, the filament has the angular position shown in FIG. 4, it has, on the right, a cutting edge 202 that makes it possible to engage the plants to be cut with good cutting effectiveness. Naturally, if the cutting head rotates in the reverse direction, the plants to be cut are engaged via the opposite edge.

Such a filament is designed to be cut to length and folded over in substantially U-shaped manner so that the two free branches of the U pass through two slots 114 of the portion 110 of the head, and so that the end wall of the U extends inside the threaded branches 112 of the head. In the present example, three U-shaped filaments are thus formed, those three U-shaped filaments then forming six cutting strands in all.

During this assembly, the V-shaped end walls 115a, 115b of each slot 114 serve to receive snugly that portion of the cutting filament 200 which is situated in register with said slot. When the portion 120 of the head is screwed onto the portion 110, until its shoulder 121a bears against the top edge of each filament, it thus firmly holds the filament in the desired position, as shown in FIG. 5, which shows in detail how a filament is locked.

It is thus guaranteed that the cutting filament 200 does indeed take up the cutting position shown in FIG. 4, with sides inclined at substantially 45° relative to the horizontal and to the vertical.

Insofar as the cutting filament is sufficiently rigid over its entire working length, it is guaranteed that it is indeed a side cutting edge 202 of the filament that finds itself at the leading edge of said filament.

FIG. 6 shows another embodiment of a cutting head, in which the cutting head is in the form of a hollow cylindrical body provided with a series of square-shaped orifices 130 of size slightly larger than the cross-section of the cutting filament, the angular positioning of the orifices being as shown, with sides at 45° relative to the horizontal and to the vertical. The cutting filament or each cutting filament, in the form of a single strand or of a U-shaped double strand, is locked inside the head 100 by clamping means (not shown), typically screw-clamping means, in a manner known per se. Naturally, the shape and the dimensions of the orifices 130 are determined as a function of the shape and of the dimensions of the cross-section of the cutting filament, a wide variety of shapes and dimensions being possible, as explained below.

Figure 8:
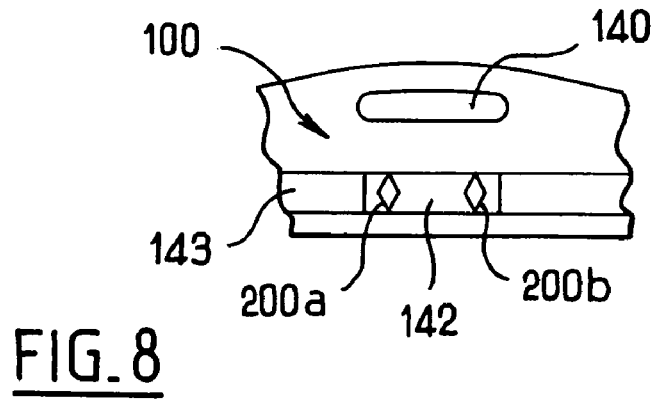
FIG. 8 is a fragmentary elevation view of the cutting head of FIG. 7.

FIGS. 7 and 8 show another embodiment of a cutting head, in which U-shaped filaments are also mounted.

FIGS. 7 and 8 show a cutting head 100 that is generally circular (shown in fragmentary manner), and provided with a series of cavities 140, each of which receives a hook 141 extending towards the axis of rotation AA of the head and occupying only a portion of the respective cavity 140, so that the portion of the U-shaped filament that is folded over through about 180° can be inserted into the cavity, after the two cutting strands 200a, 200b have been inserted, from the inside, into a through opening 142 extending between the cavity 140 and the outside of the head, and opening out into a peripheral groove 143. By pulling on the two cutting strands 200a, 200b, the folded over portion of the filament comes to wedge behind the hook 141, so as to retain the filament in this position.

With such a U-shaped mounting configuration, the passageway 142, which is generally rectangular and common to the two strands, as shown in FIG. 8, is not suitable in itself for forcing the strands of the cutting filament to take up a determined angular position.

However, if, with such a cutting head, a filament is used such that it has a preferred bending direction, the 180° bend through which the filament extends where the two working strands meet makes it possible, by means of said preferred bending, to impart a preferred angular positioning to the strands.

Figure 9:
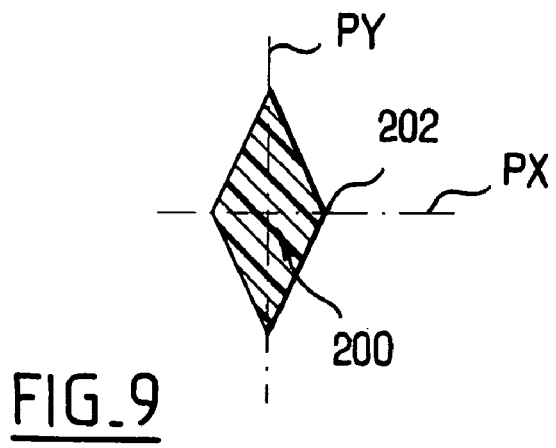
FIG. 9 is a cross-section view through an example of a cutting filament that can be used with the cutting head of FIGS. 7 and 8.

For example, if consideration is given to a cutting filament 200 whose diamond shaped cross-section is shown in FIG. 9, it can be understood that, since its width is substantially smaller than its height, its preferred bending takes place in a plane PX passing through its two side edges.

In this way, mounting such a filament in a cutting head for receiving U-shaped filaments imparts to the working strands an angular positioning as shown in FIG. 8, in which the plants are engaged at an edge 202 (even if, in this example, it is not the sharpest edge), rather than at a plane face of the cutting filament.

FIGS. 10 to 13 show another example of a cutting filament 200 having preferred bending, and capable of behaving as described above when subjected to U-shaped mounting.

This filament has a square starting cross-section and generally curved notches 203 are provided at regular intervals along both of its side edges, while its top and bottom edges are left intact.

The cross-sections of the filament, respectively at an interval between two notches, and at the deepest point of one of the notches, are shown respectively in FIGS. 12 and 13. It can be understood that, because such a filament has, on average, a width substantially smaller than its height, its preferred bending takes place in the plane PX as in the preceding example. Thus, the filament is angularly positioned such that the edges 202 that are provided between the notches constitute the working edges of the filament. The edges are thus serrated by means of the presence of said notches, and the effectiveness of the cutting work is improved even further.

It should be noted that such notches, or more generally any other configuration aimed at causing the filament to bend in preferred manner in the plane PX, can advantageously be provided on a polyamide filament made by extrusion, by means of a shaping tool operating on the filament while it is still hot and deformable, or else by means of a bladed tool forming the notches or the like by removing material.

FIGS. 14 to 18 show certain other possible embodiments of a cutting filament having at least one well-determined working zone, requiring the filament to be mounted in the cutting head in a controlled angular position.

Thus, FIG. 14 shows a filament 200 that is generally square in cross-section, as above, suitable for being angularly positioned with its faces inclined at about 45° relative to the horizontal and to the vertical so as to operate at one of two side edges (depending on the direction of rotation).

In this embodiment, the zones 230 of the filament that are situated in the vicinity of the edges are made of a material that is different from the material of which the main body 240 of the filament is made. In the present example, the zones are of triangular cross-section, with a transition between the two materials at vertical planes.

For example, the component material of the main body 240 is a polyamide, while the component material of the working zones 230 is a plastics material, e.g. also a polyamide, having properties that are different in terms, in particular, of flexibility and/or of hardness and/or of resistance to wear.

In particular, it can be a polyamide containing, in a manner known per se, one or more additives serving to reduce its flexibility, or else a polyamide filled in a manner known per se with particles (particles of metal, glass fiber, carbon fiber, etc.) serving to improve hardness and thus cutting effectiveness and resistance to wear. Naturally, the presence of additives and of filler particles can be combined.

It should be noted that such a filament can be manufactured in particular by a co-extrusion technique that is known per se.

FIG. 15 shows another embodiment of a cutting filament, in which, in at least one working zone 230, notches 203 are formed so as to give the at least one working zone a serrated edge which improves cutting effectiveness. If the notches are sufficiently deep, preferred bending is achieved as described above so as to ensure that the filament does indeed effect the cutting at one of the working zones. Such a serrated edge can be obtained by any suitable technique such as, in particular, deformation while the portions to be worked are still plastically deformable, or removal of material, using blades or the like.

FIG. 16 shows a cutting filament analogous to the cutting filament of FIG. 14 (or of FIG. 15 in the serrated version), which is however truncated at the top and bottom at respective ones of two horizontal planes, so as to be provided with two generally horizontal plane faces 204.

Such an embodiment makes it possible, in particular to improve the aerodynamics of the filament, and thus to increase the cutting speed for the same engine or motor power, or else to reduce the fatigue in the engine or motor.

FIG. 17 shows another filament which, at the periphery of a main body 240, has a localized working zone 250 on at least one of its sides, at which zone the plants are engaged. In this embodiment, the filament has a circular cross-section, like a conventional filament. However, at at least one side region, it has a working coating, comprising, for example, a metal or a metal alloy applied by deposition. The coating can also comprise a thin zone of filled polyamide material formed by co-extrusion.

In this example too, the cutting head is adapted to be capable of retaining the filament in an angular position such that the working zone 250 is indeed situated in the leading edge region of the filament.

FIG. 18 shows another example of a cutting filament, with an airfoil profile. It has a main body 240 and, at its leading region, a working zone 260 is formed of some other material, in particular a material that is more resistant to wear, the resulting assembly being preferably manufactured by co-extrusion.

FIG. 19 shows a cutting filament with a circularly symmetrical main body or core 240 made of a first polyamide material, and cladding 232 surrounding the core 240 completely, and laterally carrying two projecting portions 230, 230 formed integrally with it. The cladding 232 and the projecting portions 230 are made of a material that is more rigid and/or more wear resistant than the core 240, as described above.

In this example too, a serrated edge can be formed on one side and/or on the other side, by forming cavities in the cutting edge 202. In the present example, the serrated edge has symmetrical triangular teeth, other shapes of teeth naturally being possible.

This embodiment makes it possible to secure the main body of the filament, formed essentially by the core 240, more firmly to the working side portions 230.

FIG. 20 shows a structure analogous to the structure of FIG. 19, with a core 240 of smaller diameter and cladding that is thicker. It is thus possible to act on the overall flexibility of the filament and thus on its cutting behavior.

FIG. 21 shows another cutting filament structure, with a core made up of two portions 240', 240", separated by a thin vertical portion 245 made of material that is preferably harder, e.g. the same material as the material of which the working portions 230 are made (which working portions are similar to those of FIGS. 19 and 20). The resistance to vertical bending is thus improved, as is the horizontal stability of the filament during cutting. In this example, in order to achieve good aerodynamics, the core 240', 240" has top and bottom faces that are rounded.

Finally, FIG. 22 shows a variant of FIG. 21, in which the side working portions 230 are formed by co-extrusion so that they are fitted into channels 241 formed laterally in the core portions 240', 240". In this way, the bonding strength between the working portions 230 and the core 240', 240" is improved.

Naturally, the present invention is in no way limited to the embodiments described and shown, but rather the person skilled in the art can make numerous variants and modifications to it. In particular, the various embodiments can be combined with one another.

It should finally be noted that the invention is applicable preferably to filaments having cross-sectional areas that are relatively large (typically greater than 3 mm$^2$), with a torsion stiffness such that, over substantially the entire working length of a strand, it is assured that the desired working zone engages the plants.

The invention claimed is:

1. A cutting unit for a plant cutting device such as an edge trimmer or a brush cutter, comprising:

a plurality of cutting filaments, with each filament having a cross section defined by four flat intersecting faces, with at least two of the faces intersecting to define a toothed cutting edge and with at least two edges devoid of teeth, and a rotary cutting head comprising:

(a) a generally cylindrical tubular drum which defines a central axis and includes a peripheral wall, said wall being provided with a plurality of axially extending slots, wherein said slots each comprise at least one side inclined at an angle between approximately 35° and approximately 55° relative to the horizontal and to the vertical, with each filament positioned to extend through at least one of the slots in an orientation wherein the toothed cutting edge faces circumferentially forward with respect to the central axis, and (b) a retaining member adapted to press the filament against said inclined side of the slot in such a manner that the filament is maintained in a position such that the toothed cutting edge of the filament constitutes the leading edge that engages the plants, and such that the two faces defining the toothed cutting edge slope back respectively upwards and downwards relative to the cutting edge.

2. The cutting unit according to claim 1 wherein the filaments each have a generally square cross section.

3. The cutting unit of claim 1 wherein the cutting edge and adjacent portions of the two intersecting faces of each cutting filament define a working zone, and wherein the working zone comprises a material different from the material of the remainder of the filament.

4. A cutting unit for a plant cutting device such as an edge trimmer or a brush cutter, comprising:

a rotary cutting head comprising:

(a) a first portion which comprises a generally cylindrical tubular drum which defines a central axis and includes a peripheral wall, said wall being divided by a plurality of axially extending slots which have an open top and a closed bottom wall, and with the exterior of the peripheral wall being externally threaded, and (b) a second portion which comprises an internally threaded sleeve which is threadedly received on the drum of the first portion and which includes a transverse shoulder which is positioned to oppose the bottom wall of the slots in the peripheral wall of the drum and define a radial opening therebetween;

a plurality of cutting filaments, with each filament having a cross section defined by four flat intersecting faces, with at least two of the faces intersecting to define a toothed cutting edge and with at least two edges devoid of teeth, and with each filament positioned to extend through at least one of the openings in an orientation wherein the toothed cutting edge faces circumferentially forward with respect to the central axis, and wherein the bottom wall of each slot has a generally V-shaped cross section which closely matches the cross section of two adjacent faces of the filament, and wherein the shoulder of the second portion bears against the filament to bias the filament against the bottom wall of the slot and retain the filament therein in said orientation.

5. The cutting unit according to claim 4 wherein the filaments each have a generally square cross section.

6. The cutting unit according to claim 5 wherein each of the filaments is bent into a U-shaped configuration and so that each filament extends through two of the openings.

7. The cutting unit of claim 4 wherein the cutting edge and adjacent portions of the two intersecting faces of each cutting filament define a working zone, and wherein the working zone comprises a material different from the material of the remainder of the filament.

8. A cutting unit for a plant cutting device such as an edge trimmer or a brush cutter, comprising:

a rotary cutting head comprising a generally cylindrical tubular drum which defines a central axis and includes a peripheral wall, said wall being provided with a plurality of radial openings, with the openings each having a bottom wall of V-shaped cross section having sides at about 45° relative to the horizontal and to the vertical, a plurality of cutting filaments, with each filament having a cross section defined by at least four flat intersecting faces, with two of the faces intersecting to define a toothed cutting edge and with at least two edges devoid of teeth, and with each filament positioned to extend through at least one of the openings in an angular orientation wherein two of the faces of the filament closely match and rest upon the sides of the bottom wall of the opening and with the cutting edge facing circumferentially forward with respect to the central axis, and clamping means to retain the filament in said angular orientation such that the toothed cutting edge of each strand constitutes the leading edge that engages the plants, and such that the two faces defining the toothed cutting edge slope back respectively upwards and downwards relative to the cutting edge.

9. The cutting unit according to claim 8 wherein the filaments each have a generally square cross section.

10. The cutting unit according to claim 8 wherein the clamping means comprises screw-clamping means for pressing each of the filaments downwardly against the bottom wall of the receiving opening to lock the filament in said angular orientation, which screw-clamping means operates in the vicinity of the opening.

11. The cutting unit of claim 8 wherein the cutting edge and adjacent portions of the two intersecting faces of each cutting filament define a working zone, and wherein the working zone comprises a material different from the material of the remainder of the filament.

* * * * *